April 11, 1961 H. D. STEVENS 2,979,104
APPARATUS FOR MAKING PNEUMATIC AIR SPRINGS
Filed Dec. 7, 1956 4 Sheets-Sheet 1
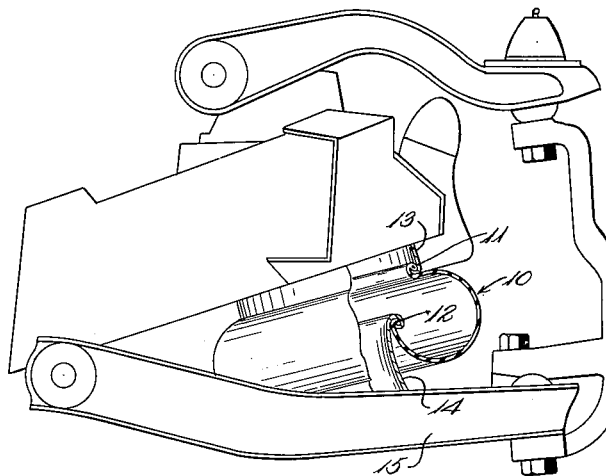
FIG.1
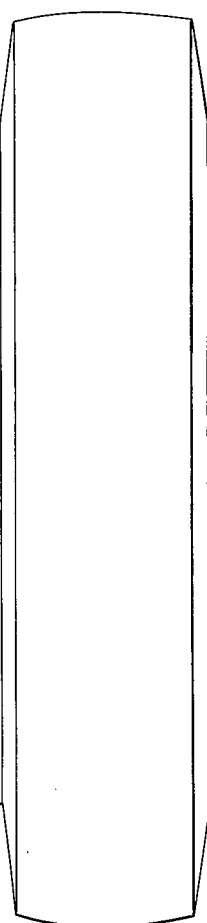
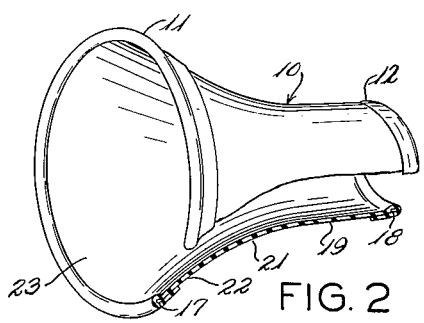
FIG. 2
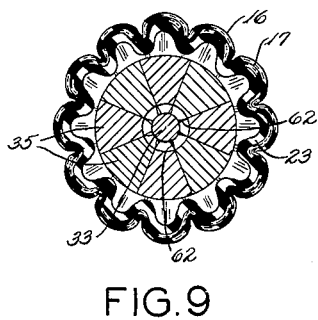
FIG. 9
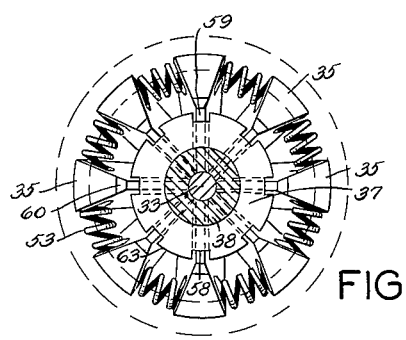
FIG. 10
INVENTOR.
HORACE D. STEVENS
BY W. A. Fraser
ATTY.

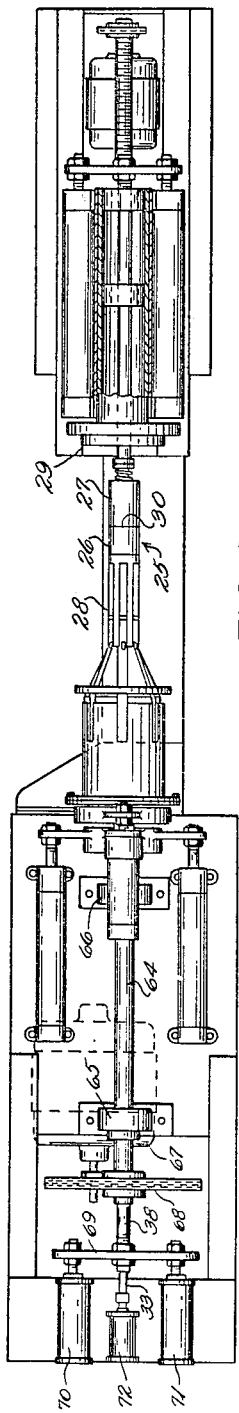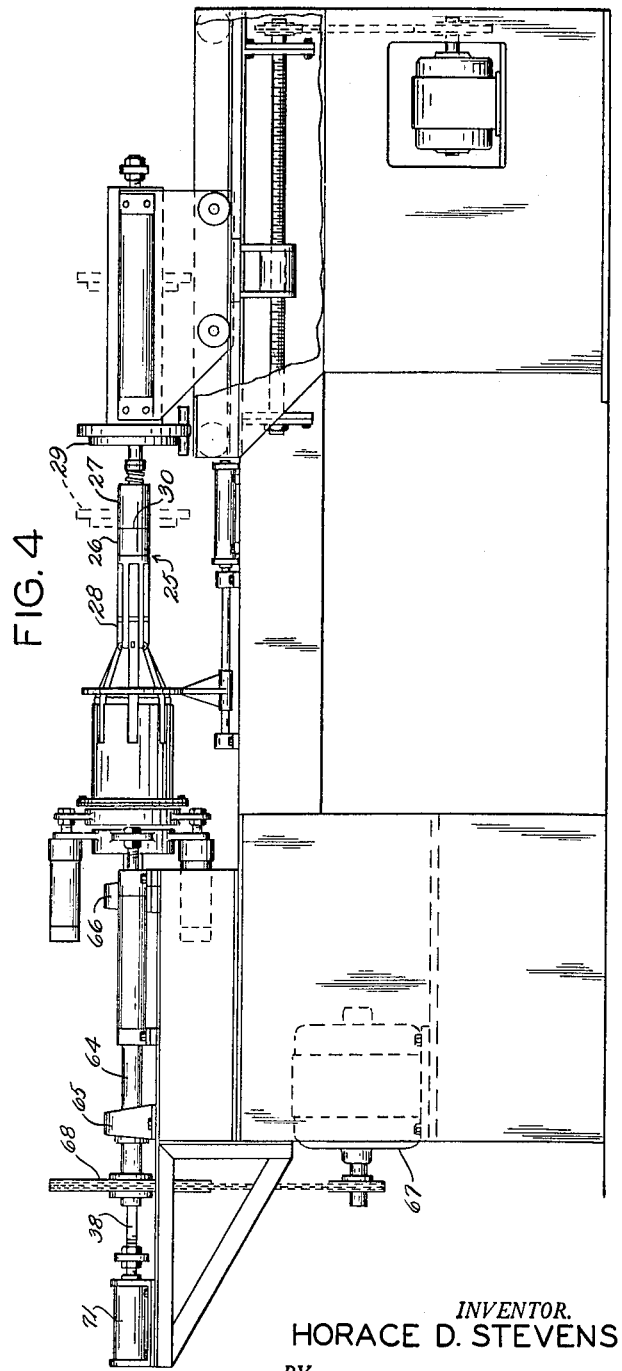

INVENTOR.
HORACE D. STEVENS
BY W. A. Fraser
ATTY.

April 11, 1961  H. D. STEVENS  2,979,104
APPARATUS FOR MAKING PNEUMATIC AIR SPRINGS
Filed Dec. 7, 1956  4 Sheets-Sheet 4
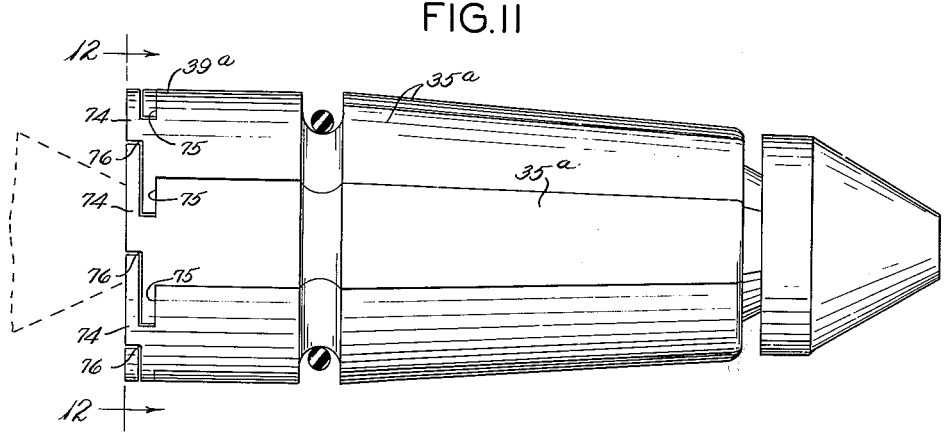
FIG.11
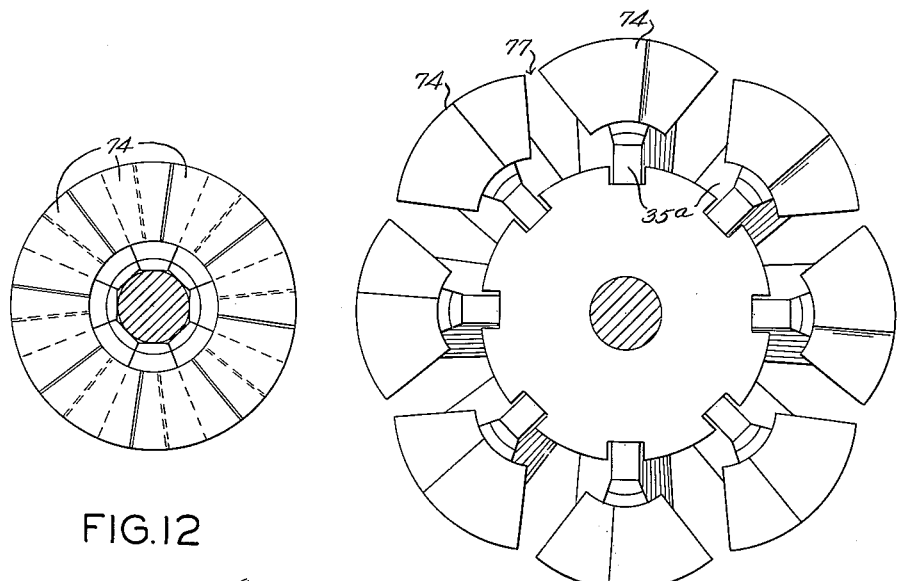
FIG.12
FIG.13
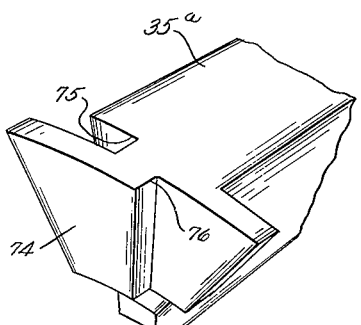
FIG.14
*INVENTOR.*
HORACE D. STEVENS
BY W. A. Fraser
ATTY.

United States Patent Office 2,979,104
Patented Apr. 11, 1961

2,979,104

APPARATUS FOR MAKING PNEUMATIC AIR SPRINGS

Horace D. Stevens, Sarasota, Fla., assignor to The Firestone Tire & Rubber Company, Akron, Ohio, a corporation of Ohio Filed Dec. 7, 1956, Ser. No. 626,966

16 Claims. (Cl. 154—1)

This invention relates to pneumatic bellows of the type known as air springs and more particularly to an improved method and apparatus for manufacturing such air springs.

The copending application of R. W. Brown and J. L. Hollis, Serial Number 521,031, filed July 11, 1955, now abandoned, discloses an air spring which has a single convolution body terminating in substantially inextensible beads, the fabric plies making up the body being wrapped about and anchored to metal rings which form the cores of the beads.

In building such an air spring, the fabric plies are assembled on a building drum with the end portions of the plies projecting beyond the drum. The projecting ply portion at one end of the drum is then turned radially inwardly over the shoulder of the drum and a metal bead ring is set against the inturned plies at the drum shoulder. The ply ends are then turned back outwardly about the bead ring and stitched back upon the plies. The present invention is specifically directed to means for performing this last-mentioned operation, that is, the operation of turning the inturned plies outwardly back and around the bead ring. The invention is particularly useful where the plies are turned inwardly to small diameters and where the percentage of contraction in diameter of the plies about the bead ring is relatively large. Under such conditions it is difficult to form the plies without the formation of wrinkles which tend to interfere with the molding of the bead of the air spring and which may at times detract from the performance of the finished air spring. With the present invention the formation of wrinkles is minimized.

The invention, in its preferred form, is embodied in an expanding mandrel which normally lies within the building drum and which is initially moved axially outwardly to shape the inturned plies into an approximately axial form. The mandrel is halted in a position which is carefully located with respect to the bead ring and the head is then expanded radially to force the plies outwardly into a radially extending position from which they are turned back upon and stitched to the body of the air spring. The apparatus is effective in producing a tight, strong bead with a minimum of wrinkles.

Among the objects of the invention therefore are to provide an effective ply-expanding apparatus to turn the plies of an air spring outwardly about a bead ring; to provide apparatus which will produce a tight, compact bead construction for air springs and like articles with a minimum of wrinkling of the plies forming the bead; to provide such apparatus which is rugged in construction and durable in service; to provide such apparatus which is compact, simple and effective in design and in operation; to provide such apparatus which is automatic in operation.

These and further objects and advantages will more fully appear from the following description of the invention, reference being had to the accompanying drawings in which:

Figure 1 is a front elevation, partly in section, of an air spring manufactured according to the present invention, the air spring being shown assembled in a typical front wheel suspension of an automobile;

Figure 2 is a perspective view of an unvulcanized single convolution air spring of the type shown in Figure 1, the air spring being shown just after it has been removed from the building drum, and prior to its being molded into the finished form of Figure 1;

Figure 3 is a top elevation of an air spring building drum of a type in which the apparatus of the present invention is advantageously used;

Figure 4 is a side elevation of the air spring building drum of Figure 3;

Figure 9 is a sectional view of the apparatus of Figure 6; the section being taken in the transverse plane indicated by the lines 9—9 in Figure 6;

Figure 10 is a sectional view taken in the transverse plane indicated by lines 10—10 in Figure 7;

Figure 11 is a side elevation showing a modified form of expanding mandrel, the view being similar to that shown in Figure 5, but on a somewhat larger scale than Figure 5;

Figure 12 is a sectional view of the mandrel of Figure 11, the view being taken in the plane indicated by the line 12—12 in Figure 11, the mandrel being shown in the contracted position;

Figure 13 is a sectional view taken in a transverse plane showing the mandrel of Figures 11 and 12 in expanded position, the mandrel having a position corresponding to that shown in Figure 7;

Figure 14 is a perspective view showing the construction of the fingers of the expanding mandrel of Figures 11–13.

Figure 5:
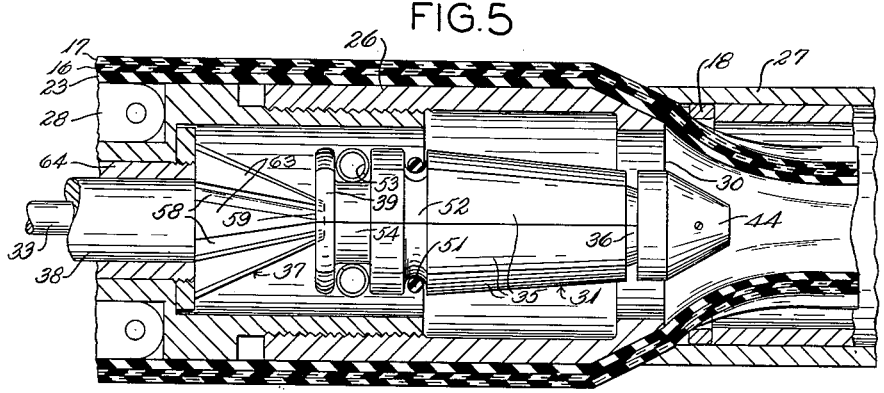
Figure 5 is a longitudinal sectional view on an enlarged scale of a portion of the air spring building drum of Figures 3 and 4 showing the apparatus embodying the present invention, the building drum being shown with the fabric body plies of an air spring turned inwardly over a shoulder of the drum and with the bead ring set in place against the plies.

The present invention is described, by way of example, with reference to the building of an air spring such as that indicated generally at 10 in Figure 1 where it is shown assembled in the front wheel suspension of an automobile. The air spring 10 comprises a single convolution body terminating at its ends in inextensible beads 11 and 12, respectively, which, it will be noted, are of substantially different diameters. The larger bead 11 is mounted by conventional means 13 to the frame of the automobile, while the smaller bead 12 is mounted by a member 14 to the lower pivotal arm 15 of the wheel suspension.

The air spring 10 contains air under pressures in the order of 80–150 pounds per square inch and it cushions road shocks by deflecting in such a manner that the small bead 12 passes upwardly toward and sometimes completely through the larger bead 11 in a telescoping movement. In order to contain such fluid pressures and to undergo such severe flexing, the body of the air spring is built up of rubberized fabric plies 16 and 17 which are wrapped about and anchored to metal bead rings 17 and 18 to form the beads of the air spring. An inner liner 18 is also provided to help retain air. The air spring of Figure 1 is shown in substantially its vulcanized shape but it is preferably initially built in the shape shown in Figure 2, and is subsequently molded to its final shape.

The unvulcanized air spring 1 in the present example is about 9 inches long and comprises an essentially cylindrical portion 19 which is connected by a curved portion 21 to a radial portion 22. The large bead 11 has a mean diameter of about 6 inches, while the small bead 12, which is inturned from the cylindrical portion as indicated, has a mean diameter of about 3 inches.

The air spring of Figure 2 is built by assembling the fabric plies, such as rubberized rayon or nylon fabric, and the other elements of the air spring, upon a substantially cylindrical building drum such as that indicated generally at 25 in Figures 3 and 4, and comprising a central drum section 26 and a movable end section 27. The building drum as shown has a number of operational parts associated with it which form no part of this invention and which will not be described in detail. Thus the apparatus indicated at 28 at the left of drum section 26 is intended to produce the outwardly flaring portions 21 and 22 of the air spring while the apparatus shown at the right of the building drum and indicated generally at 29 comprises the devices to contract the ply ends of the fabric and to set the bead ring 18 in position for the forming of small bead 12.

The apparatus in which the present invention is embodied is specifically shown in Figures 5–8 in which only so much of the building drum is shown as is necessary to illustrate the environment in which the invention is intended to function.

Thus, as shown in Figure 3, after the fabric plies 16 and 17 and the inner liner 23 are assembled on the drum, the end section 27 of the drum is drawn to the right, leaving the ply ends projecting beyond the shoulder 30 of drum section 26. The projecting ply ends are then turned radially inwardly over the shoulder of the drum, either manually or by any suitable means, and the bead ring 18 is set against the plies in the position shown in Figure 5. It is at this point of the building operation that ply-turning apparatus embodying the present invention is utilized to turn the ply ends back around the bead ring 18 to produce the small bead 12 of the air spring. The successive steps in the operation of the apparatus are shown in Figures 5–8, inclusive.

The apparatus comprises two main parts, one being an expanding mandrel indicated generally at 31 which is normally located within the central drum section 26 while the prior building operations referred to above take place. After the bead ring 18 has been set, the mandrel is moved out of the drum into operative position adjacent the plies, see Figure 6, and is then expanded to force the plies outwardly as shown in Figure 7. Then the other main part, a ply-turning sleeve 32 turns the plies back around the bead ring, see Figures 7 and 8. The expanding mandrel 31 is mounted on and carried in its axial movement into and out of the drum by a central shaft 33. The mandrel is made up of a number of longitudinal fingers 35 (in this example eight fingers are shown) which are pivotal in a radially outward direction about their outer ends 36. The fingers are expanded by a conical member 37 which is mounted on and carried by a tubular shaft 38 which telescopes over the central shaft 33.

Figure 6:
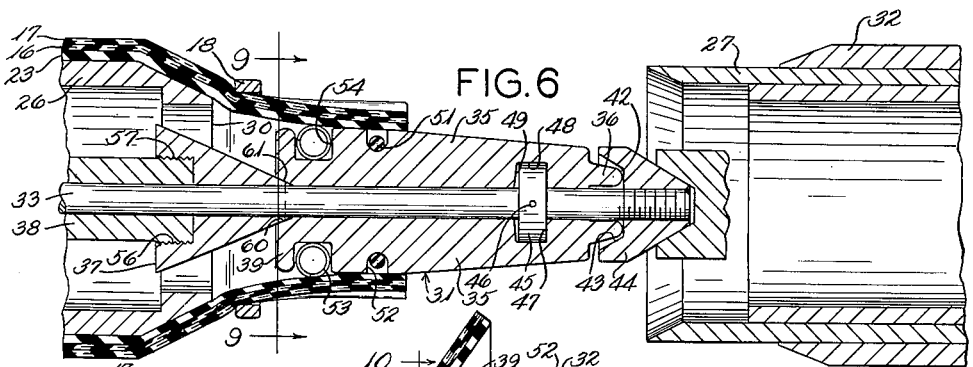
Figure 6 is a view similar to Figure 5 showing the expanding head moved out of the building drum to force the plies into an axially-extending, substantially cylindrical form.
Figure 7:
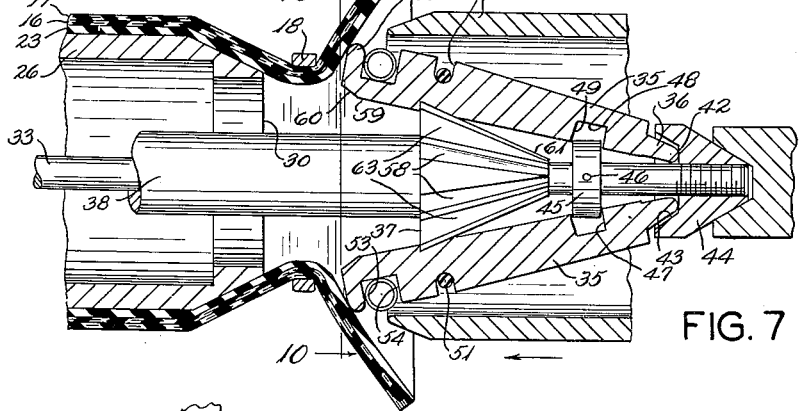
Figure 7 is a view similar to Figure 6 showing the head expanded to force the plies in an approximately radially outward direction and with a ply-turning sleeve in position for the next operation.
Figure 8:
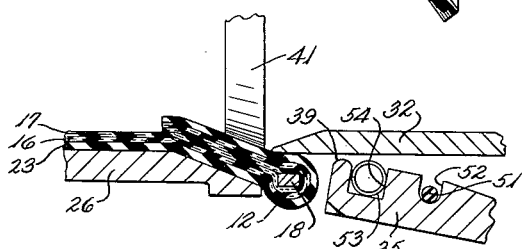
Figure 8 is a fragmentary view of a portion of the apparatus of Figure 7 showing the manner in which the ply-turning sleeve forces the ply ends back around the bead ring and into position for engagement by a conventional stitching tool.

In the initial operation of the apparatus, the expanding mandrel is moved from the position of Figure 5 to the position of Figure 6 with the mandrel coming to rest with the inner ends 39 of the fingers located close to and axially just beyond the bead ring 18 as shown in Figure 6. It will be observed that this movement of the mandrel brings the inturned plies into a substantially cylindrical form. In the next step, the mandrel is held stationary while the conical member 37 is moved within the fingers to expand them by pivoting them radially outwardly about their outer ends 36 until the fingers swing to the position of Figure 7, this relative movement of the parts being accomplished by a telescoping movement of the tubular shaft 38 upon the central shaft 33.

As the fingers move out, their flanged ends 39 force the plies into approximately the position shown in Figure 7 where the plies have a substantial component of inclination in the radial direction. In this position the plies can be readily engaged by the end of a tubular ply-turning sleeve 32 which is mounted in telescoping fashion over the drum section 26 and which can be moved inwardly upon the plies to turn them from the position of Figure 7 around the bead ring to the position of Figure 8 where they can be engaged by a conventional stitching roll 41 and stitched back upon the plies to form a tight, strong bead structure. The ply-turning sleeve preferably has a rounded edge so that it will slide freely over the plies and it engages the plies close to the points of contact of the finger ends 39 with the plies.

Since the inner diameter of the small bead is only about 1⅛ inches, the mandrel 31 should be compact in design. Accordingly, the fingers 35 are hinged by having the outer end portions 36 reduced in section and terminating in rounded edges 42. The reduced portions fit snugly within a frusto-conical groove 43 defined by the central shaft 33 and by a counterbored plug 44 which is threaded onto the shaft, see particularly Figure 6. The fingers are held in position with respect to the plug by a circular keeper member 45 which is fixed to the central shaft as by a pin 46 and which fits within a circular groove 47 in the mandrel which is defined by aligned radial notches 48 in the fingers. The notches 48 are slightly tapered as indicated at 49 to enable the fingers to swing outwardly without restriction by the keeper. It will be noted that when the fingers are fully expanded, the notches 48 do not swing completely clear of the keeper which is still engaged within the notches, as shown in Figure 7, thus keeping the rounded ends 42 of the fingers in bearing contact with the threaded plug 44. This arrangement ensures an accurate pivoting movement of the fingers and provides a rugged and strong construction.

The fingers are preferably tapering in cross-section as shown in Figure 9 and are normally urged into closed position with their inner surfaces in close contact with the central shaft by a resilient rubber ring 51 which fits within circular groove formed by radial notches 52 in the outer surfaces of the fingers. A coil spring or any other resilient means may be substituted for the rubber ring. In order to facilitate the axial movement of the expanding mandrel from within the drum through the inturned plies, it is preferable that the fingers be tapered in the longitudinal direction also so that the mandrel will be slightly conical in form, as best shown in Figure 5.

Since the flanged ends 39 of the fingers become radially spaced as soon as the mandrel is expanded, a coil spring 53 is positioned in a groove 54 adjacent the flanges 39 to provide, what is in effect, continuous circumferential means to engage the plies and minimize the formation of wrinkles, the coil spring serving to bridge the gaps between the fingers especially when the mandrel first expands and thereby prevent the plies from folding and wrinkling during the first portion of the expanding movement.

The conical member 37 is counter-bored and threaded as at 56 so that it can be turned onto the threaded end 57 of tubular shaft 38, as best shown in Figure 6. It also is provided with longitudinally extending grooves 58 at its outer surface, to receive the inner edges 59 of the fingers as the member 37 moves under the fingers during the expanding movement. The grooves also guide the fingers when the fingers move back into contact with the central shaft under the urging of the rubber ring 51. In order that the conical member and fingers will remain in proper alignment with each other at all times, the fingers are slightly recessed as indicated at 60 to receive the small end 61 of the conical member when the mandrel is in its contracted position, see particularly Figure 6, and the ends of the fingers are slightly cut away, as indicated at 62, to receive the lands 63 between the longitudinal grooves 58 of the conical member. The fingers and the conical member are thus never completely disengaged and hence cannot become misaligned.

The central shaft 33 and the tubular shaft 38 are positioned within a main tubular drive shaft 64 which is used to drive the building drum during the building operation and which is cantilever supported in spaced bearings 65 and 66. The shaft 64 is driven by an electrical motor 67 operating through a suitable transmission 68. The tubular shaft 38 extends to the left beyond the drive shaft where it is connected to a yoke 69 and a pair of air cylinders 70 and 71 which, acting through the yoke, give the tubular shaft 38 its required axial movement to operate the conical member 37. The central shaft 33 in turn projects to the left beyond the end of the tubular shaft 38 where it is connected to an air cylinder 72 which acts directly upon the shaft to give it its required axial movement in positioning the expanding mandrel.

An alternative form of the invention insofar as the expanding mandrel is concerned is illustrated in Figures 11 and 13. In fact, for many applications, this latter form of the invention is preferred. The swinging ends 39a of the fingers have a construction comprising circumferentially overlapping flanges arranged in such a manner that the overlapping of the flanges persists during the initial portion of the expanding movement of the mandrel to provide a continuous circumferential supporting surface engaging the plies.

Thus each finger 35a terminates in a pair of circumferentially extending flanges 74 defined by notches 75 and 76. When the mandrel is contracted as shown in Figures 11 and 12, the flanges of each finger fully intermesh with the flanges of the adjacent fingers. There is a partial intermeshing as the mandrel first expands and finally there is a small gap 77 between adjacent fingers in the fully expanded position shown in Figure 13. The gaps 77 are so small that the fabric readily bridges them. The effective continuous circumferential support which this construction provides minimizes the formation of wrinkles and tends to iron out any wrinkles that may have formed during the operation of the device.

Various changes and modifications will no doubt occur to those skilled in the art without departing from the scope of the invention the essential features of which are defined in the appended claims.

I claim:
1. Apparatus for expanding the body of an air spring around a bead ring after the body plies have been turned radially inwardly over the shoulder of a supporting drum and the bead ring has been set in position against the inturned plies at said drum shoulder, said apparatus comprising a plurality of longitudinal fingers grouped together to form an expanding mandrel, a longitudinal shaft supporting said fingers and terminating in an enlarged head having a groove open toward said shaft, said fingers having reduced portions at their outer ends extending into the said groove and having bearing contact with the walls of said groove, means having relative longitudinal movement with respect to said fingers to move said fingers in a radially outward direction in a pivoting movement about said reduced end portions as pivots, whereby the free ends of said fingers engage said plies and force said plies radially outwardly about said bead ring.

2. Apparatus according to claim 1 and means engaging said fingers to maintain the reduced ends thereof in bearing contact with the walls of said groove continuously throughout the pivoting movement of said fingers.

3. Apparatus according to claim 2 in which said last named means comprises a projection extending from said shaft and engaging transverse surfaces of said fingers to restrain the longitudinal movement of said fingers away from said groove.

4. Apparatus according to claim 3 in which said projection comprises an annular member fixed to said shaft and extending into a groove in said mandrel defined by circumferentially aligned notches in said fingers.

5. Apparatus according to claim 4 in which said last-named groove is tapered to permit the pivoting movement of said fingers without restraint thereby.

6. Apparatus for expanding the plies of an air spring around a bead ring after the plies have been turned radially inwardly over the shoulder of a supporting drum and the bead ring has been set in position against the plies at said building drum shoulder, said apparatus comprising a plurality of longitudinal fingers grouped together to form an expanding mandrel, and a shaft terminating in a radial portion with axially extending recesses opening toward said fingers, said fingers having their outer ends extending into said recesses respectively to have their bearing contact with the surfaces of said recesses, first means having relative longitudinal movement with respect to said fingers to move said fingers in a radially outward direction in a pivoting movement about their said ends as pivots, whereby the free ends of said fingers engage said plies and force said plies radially outwardly about said bead ring.

7. Apparatus according to claim 6 and radial means extending from said shaft to engage transversely extending surfaces in said fingers and restrain said fingers against axial movement along said shaft.

8. Apparatus according to claim 6 and resilient means encircling said fingers to urge said fingers radially inwardly into engagement with said shaft.

9. Apparatus according to claim 6 and second means adjacent the free ends of said fingers and expansible with said mandrel to bridge the gaps between said expanded fingers and form a circumferentially continuous support to engage said plies.

10. Apparatus according to claim 9 in which said second means comprises a coil spring disposed in a groove adjacent the free ends of said fingers.

11. Apparatus for expanding the plies of an air spring around a bead ring after the plies have been turned radially inwardly over the shoulder of a supporting drum and the bead ring has been set in position against the plies at said drum shoulder, said apparatus comprising a shaft movable axially with respect to said drum, a nut threaded onto the outer end of such shaft and having a counter-bore opening upon said shaft, the outer surface of said shaft and the counter-bored portion of said nut thereby defining a circular groove, a plurality of longitudinal fingers grouped about said shaft to form an expanding mandrel, said fingers having their outer ends extending into the said groove and having bearing contact with the surfaces of said groove, a circular groove in said mandrel defined by circumferentially aligned notches in said fingers adjacent the inner ends of said fingers to form radial flanges at the ends of said fingers and means disposed in said groove and projecting radially slightly beyond outer surfaces of said fingers to bridge the gaps between said fingers when said mandrel is expanded, a conical member having relative longitudinal movement with respect to said fingers engaging radially inner surfaces of said fingers to cam said fingers in a pivoting movement in a radially outward direction about the outer ends of said fingers as pivots, said expanding mandrel normally being positioned within said drum, means to move said mandrel axially out of said drum with the flanged ends of said fingers positioned adjacent said bead ring and to move said member into engagement with said fingers whereby said fingers are expanded and the flanged ends of said fingers and the adjacent means in said groove force said plies radially outwardly about said bead ring.

12. Apparatus for expanding the plies of an air spring around a bead ring after the plies have been turned radially inwardly over the shoulder of a supporting drum and the bead ring has been set in position against the plies at said drum shoulder, said apparatus comprising a shaft movable axially with respect to said drum, a nut threaded onto the outer end of such shaft and having a counterbore opening upon said shaft, the outer surface of said shaft and the counter-bored portion of said nut thereby defining a circular groove, a plurality of longitudinal fingers grouped about said shaft to form an expanding mandrel, said fingers having their outer ends extending into the said groove and having bearing contact with the surfaces of said groove, a circular groove in said mandrel defined by circumferentially aligned notches in said fingers adjacent the inner ends of said fingers to form radial flanges at the ends of said fingers and means disposed in said groove and projecting radially slightly beyond outer surfaces of said fingers to bridge the gaps between said fingers when said mandrel is expanded, a conical member having relative longitudinal movement with respect to said fingers engaging radially inner surfaces of said fingers to cam said fingers in a pivoting movement in a radially outward direction about the outer ends of said fingers as pivots, said expanding mandrel normally being positioned within said drum, means to move said mandrel axially out of said drum with the flanged ends of said fingers positioned adjacent said bead ring and to move said member into engagement with said fingers whereby said fingers are expanded and the flanged ends of said fingers and the adjacent means in said groove force said plies radially outwardly about said bead ring, and means movable in an axial direction to contact said radially outturned plies adjacent the points of contact between said plies and expanded fingers and to turn the ends of said plies axially around the bead ring and back upon said plies.

13. Apparatus for expanding the body of an air spring around a bead ring after the body plies have been turned radially inwardly over the shoulder of a supporting drum and the bead ring has been set in position against the inturned plies at said drum shoulder, said apparatus comprising means including a plurality of longitudinal fingers grouped together to form an expanding mandrel, said fingers being hinged for pivoting movement together in a radially outward direction, means normally urging said fingers into retracted position, conical means having relative longitudinal movement with respect to said fingers and slidingly engaging said fingers along the axial inner surfaces thereof to cam said fingers outwardly in said pivoting movement, said conical means and said mandrel in the unexpanded condition being positioned within said drum, means to move said mandrel axially out of said drum into position with the free ends of said fingers located axially outwardly of and adjacent said bead ring whereby when said fingers are expanded by the conical member the free ends of said fingers force said inturned plies radially outwardly about said bead ring.

14. Apparatus for expanding the body of an air spring around a bead ring after the body plies have been turned radially inwardly over the shoulder of a supporting drum and the bead ring has been set in position against the inturned plies at said drum shoulder, said apparatus comprising means including a plurality of longitudinal fingers grouped together to form an expanding mandrel, said fingers being hinged for pivoting movement together in a radially outward direction, means normally urging said fingers into retracted position, a conical member having relative longitudinal movement with respect to said fingers and slidingly engaging said fingers along the axial inner surfaces thereof to cam said fingers outwardly in said pivoting movement, said conical means and said mandrel in the unexpanded condition being positioned within said drum, means to move said mandrel axially out of said drum into position with the free ends of said fingers located axially outwardly of and adjacent said bead ring whereby when said fingers are expanded by the conical member the free ends of said fingers force said inturned plies radially outwardly about said bead ring, and means comprising a sleeve movable in an axial direction to contact said radially outturned plies adjacent the points of contact between the plies and the free ends of said expanded fingers to turn said ply ends axially back around said bead ring and upon said plies.

15. Apparatus for expanding the body of an air spring around a bead ring after the body plies have been turned radially over the shoulder of a supporting drum and the bead ring has been set in position against the inturned plies at said drum shoulder, said apparatus comprising means including a plurality of longitudinal fingers grouped together to form an expanding mandrel, said fingers being hinged for pivoting movement together in a radially outward direction, means having relative longitudinal movement with respect to said fingers and slidingly engaging the axial inner surface thereof to cam said fingers outwardly in said pivoting movement, said mandrel in the unexpanded condition being positioned with its free finger ends within said drum, means to move said mandrel axially out of said drum into position with the free ends of said fingers axially outwardly of and adjacent said bead ring, whereby said fingers force said inturned plies first axially and then, upon expansion, radially outwardly about said bead ring.

16. Apparatus for expanding the body of an air spring around a bead ring after the body plies have been turned radially inwardly over the shoulder of a supporting drum and the bead ring has been set in position against the inturned plies at said drum shoulder, said apparatus comprising a plurality of longitudinal fingers grouped together to form an expanding mandrel, said fingers being hinged for pivoting movement together in a radially outward direction, means movable from an outside position into said mandrel to engage said fingers and cam them outwardly in said pivoting movement, whereby the free ends of said fingers force said inturned plies radially outwardly about said bead ring, said camming means and said mandrel in the unexpanded condition being positioned within said drum.

References Cited in the file of this patent

UNITED STATES PATENTS

| | | |
|---|---|---|
| 1,499,679 | Midgley | July 1, 1924 |
| 1,536,080 | Davidson | May 5, 1925 |
| 1,757,750 | Stevens | May 6, 1930 |
| 1,762,824 | Lehman | June 10, 1930 |
| 1,915,668 | Hoover | June 27, 1933 |
| 1,921,594 | Thompson | Aug. 8, 1933 |
| 2,614,952 | Kraft | Oct. 21, 1952 |
| 2,715,932 | Frazier | Aug. 23, 1955 |
| 2,715,953 | Frazier | Aug. 23, 1955 |
| 2,838,091 | Kraft | June 10, 1958 |